United States Patent
Hong

(10) Patent No.: US 10,015,236 B2
(45) Date of Patent: Jul. 3, 2018

(54) CLOUD APPLICATION ACTIVATION AND UPDATE SERVICE

(71) Applicant: Jiang Hong, San Jose, CA (US)

(72) Inventor: Jiang Hong, San Jose, CA (US)

(73) Assignee: Ricoh Company, Ltd., Tokyo (JP)

(*) Notice: Subject to any disclaimer, the term of this patent is extended or adjusted under 35 U.S.C. 154(b) by 344 days.

(21) Appl. No.: 14/610,542

(22) Filed: Jan. 30, 2015

(65) Prior Publication Data

US 2016/0226952 A1    Aug. 4, 2016

(51) Int. Cl.
*H04L 29/08* (2006.01)
*G06F 21/12* (2013.01)
(Continued)

(52) U.S. Cl.
CPC ............ *H04L 67/10* (2013.01); *G06F 21/121* (2013.01); *G06F 21/44* (2013.01);
(Continued)

(58) Field of Classification Search
CPC ................. G06F 3/1203; G06F 3/1236; G06F 3/1231–3/1232; G06F 3/1229;
(Continued)

(56) References Cited

U.S. PATENT DOCUMENTS 7,100,158 B2 *   8/2006   Nakane ................. G06F 8/65
                                                                    717/168
7,149,792 B1 *   12/2006   Hansen ................. G06F 8/65
                                                                    709/220
(Continued)

FOREIGN PATENT DOCUMENTS

EP    2 749 969 A1    7/2014
JP    2001-236212    8/2001
(Continued)

OTHER PUBLICATIONS

European Patent Office, "Search Report" in application No. 16152674.4-1853, dated Jun. 6, 2016, 7 pages.
(Continued)

*Primary Examiner* — Krista Zele
*Assistant Examiner* — Michael A Chambers
(74) *Attorney, Agent, or Firm* — Hickman Palermo Becker Bingham LLP; Malgorzata A. Kulczycka

(57) ABSTRACT

Techniques are described for providing an MFP device with access to external Web services. According to embodiments, an application registration application executed at a multi-function peripheral device receives a registration request to register a particular application with an activation server. The particular application uses at least one external Web service. In response to receiving the request, a device identification of the multi-function peripheral device is obtained; a verification request comprising the device identification number is generated, and the verification request is transmitted to the activation server to cause the activation server to generate and send a response to the application registration application. If the response indicates that the multi-function peripheral device has not been registered with the activation server, a message is displayed on a display of the multi-function peripheral device. The message may recommend purchasing a license for using the particular application.

20 Claims, 9 Drawing Sheets

(51) Int. Cl.
*H04N 1/00* (2006.01)
*G06F 21/44* (2013.01)
*G06Q 30/06* (2012.01)
*H04L 29/06* (2006.01)

(52) U.S. Cl.
CPC ......... *G06Q 30/0631* (2013.01); *H04L 67/34* (2013.01); *H04L 67/42* (2013.01); *H04N 1/00973* (2013.01); *G06Q 2220/18* (2013.01)

(58) Field of Classification Search
CPC .... G06F 11/1433; G06F 21/44; G06F 21/121; G06F 9/44505; G06F 8/65; H04L 63/08; H04L 67/10; H04L 67/00; H04L 67/42; G06Q 30/0631; G06Q 2220/18; H04N 1/00204
USPC .......................................................... 709/220
See application file for complete search history.

(56) References Cited

U.S. PATENT DOCUMENTS

| | | | | |
|---|---|---|---|---|
| 7,845,010 | B2* | 11/2010 | Fujimoto | G06F 11/327 713/165 |
| 8,213,923 | B1* | 7/2012 | Lu | H04M 3/42178 455/410 |
| 8,271,967 | B2* | 9/2012 | Wu | G06F 8/65 717/168 |
| 8,555,272 | B2* | 10/2013 | Wetherly | G06F 8/65 707/695 |
| 8,712,394 | B2* | 4/2014 | Bos | H04W 4/001 455/418 |
| 8,941,859 | B2* | 1/2015 | Atobe | H04N 1/00204 358/1.15 |
| 9,166,980 | B2 | 10/2015 | Kozuka et al. | |
| 9,201,641 | B2* | 12/2015 | Gallo | G06F 8/64 |
| 9,672,022 | B2* | 6/2017 | Evans | G06F 8/65 |
| 2005/0094787 | A1* | 5/2005 | Atobe | H04N 1/00204 379/111 |
| 2005/0166199 | A1* | 7/2005 | Willis, II | G06F 8/65 717/173 |
| 2007/0159663 | A1* | 7/2007 | Tsujimoto | G06F 9/485 358/448 |
| 2007/0167182 | A1* | 7/2007 | Tenhunen | H04M 15/55 455/512 |
| 2007/0245037 | A1* | 10/2007 | Cadio | G06F 9/4411 710/8 |
| 2008/0005029 | A1* | 1/2008 | Ando | G06F 21/10 705/51 |
| 2008/0243831 | A1* | 10/2008 | Kunitake | G06F 17/30634 |
| 2008/0270911 | A1* | 10/2008 | Dantwala | G06Q 10/10 715/741 |
| 2008/0320110 | A1* | 12/2008 | Pathak | G06F 11/1433 709/220 |
| 2009/0172658 | A1* | 7/2009 | Wood | G06F 8/61 717/174 |
| 2009/0307678 | A1* | 12/2009 | Wu | G06F 8/65 717/168 |
| 2011/0302574 | A1* | 12/2011 | Yoshikawa | G06F 8/65 717/173 |
| 2011/0317211 | A1* | 12/2011 | Yamada | G06F 9/50 358/1.15 |
| 2012/0084767 | A1* | 4/2012 | Ishimoto | G06F 8/65 717/173 |
| 2012/0173610 | A1* | 7/2012 | Bleau | H04L 67/26 709/203 |
| 2012/0218595 | A1* | 8/2012 | Miyazawa | G06F 3/126 358/1.15 |
| 2012/0293820 | A1* | 11/2012 | Mizoguchi | G06F 3/1271 358/1.13 |
| 2013/0227540 | A1* | 8/2013 | Ruster | G06F 8/65 717/170 |
| 2014/0137096 | A1* | 5/2014 | Ueda | G06F 8/65 717/171 |
| 2014/0137232 | A1* | 5/2014 | Kobayashi | H04L 63/083 726/17 |
| 2014/0214664 | A1* | 7/2014 | Kim | G06Q 20/363 705/41 |
| 2014/0344153 | A1* | 11/2014 | Raj | G06Q 20/3821 705/44 |
| 2015/0002884 | A1* | 1/2015 | Okumura | G06F 3/1203 358/1.14 |
| 2015/0007279 | A1* | 1/2015 | Hattori | H04L 63/08 726/5 |
| 2015/0046451 | A1* | 2/2015 | Yamada | G06F 9/44505 707/736 |
| 2015/0257109 | A1* | 9/2015 | Koullias | H04W 52/0296 455/557 |
| 2016/0011863 | A1* | 1/2016 | Isaacson | H04L 67/34 717/173 |
| 2016/0086069 | A1* | 3/2016 | Tajima | G06K 15/408 358/1.14 |
| 2016/0352711 | A1* | 12/2016 | Kohiyama | G06F 21/10 |

FOREIGN PATENT DOCUMENTS

| | | |
|---|---|---|
| JP | 2005-182472 | 7/2005 |
| JP | 2008-097419 | 4/2008 |
| JP | 2010-165101 | 7/2010 |
| JP | 2014-146064 | 8/2014 |
| KR | 10-2005-0073509 A | 7/2005 |
| KR | 10-2014-0095745 A | 8/2014 |
| WO | WO 2012/153486 A1 | 11/2012 |

OTHER PUBLICATIONS

Korean Patent Office, "Search Report" in application No. 10-2016-0009532, dated Oct. 20, 2016, 76 pages.

\* cited by examiner

FIG. 6

CLOUD APPLICATION ACTIVATION AND UPDATE SERVICE

FIELD OF THE INVENTION

The present disclosure relates to activating and updating cloud applications on a multi-function peripheral (MFP) device, and more specifically, to activating and updating cloud applications based on a registration status of the MFP device hosting the cloud applications.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Execution of software applications on MFP devices is usually tracked by monitoring user licenses installed for the applications. Although installing licenses may be a complex and difficult process, installing the licenses is usually a preferred business practice. To install a user license for a particular software application on an MFP device, a technician may have to obtain a machine serial number of the MFP device, launch an activation Web application, and enter the machine serial number into a GUI of the Web application to obtain a license code for the license. After the license code is obtained, the technician may have to launch another activation application to store the license code on the MFP device. Once performance of these steps is completed, users may start executing the particular application on the MFP device.

There are also some software applications that could be executed without installing a user license for the applications. Examples of such applications include various applications designed to facilitate access to cloud-printing services. Tracking an execution of such applications may be difficult, and permitting the execution without a license could lead to undesired business practices and trends.

SUMMARY

Techniques are provided for activating and updating cloud applications to make them available from an MFP device. To activate and update a cloud application, a user launches an application registration application, which allows testing whether the MFP device has been registered with an activation server. If the MFP device has been activated with the activation server, then the application registration application allows the user to register the cloud application. Otherwise, the application registration application prompts the user to register the MFP with the activation server.

In an embodiment, an application registration application executed at an MFP device receives a registration request to register a particular application with an activation server. The particular application is any type of software application that uses at least one external Web service.

In response to receiving the registration request, the application registration application obtains a device identification of the MFP device. The device identification of the MFP device may be any type of a device identifier, such as a machine serial number, a machine manufacturer code, a device model name, and the like.

In an embodiment, the application registration application generates a verification request that includes the device identification, and transmits the verification request to the activation server to cause the activation server to generate and send to the application registration application a response indicating whether the MFP device has been registered with the activation system.

Once the application registration application receives the response from the activation server, the application registration application determines whether the response indicates that the MFP device has been registered with the activation server.

If the response indicates that the MFP device has been registered with the activation server, then the application registration process proceeds to registering the particular application with the activation server.

However, if the response indicates that the MFP device has not been registered with the activation server, then the application registration application displays a recommendation message on a display of the MFP device. The recommendation message may indicate recommendations to register the MFP device with the activation server, or recommendations to purchase a license for executing the particular application on the MFP device.

BRIEF DESCRIPTION OF THE DRAWINGS

The present disclosure is illustrated by way of example, and not by way of limitation, in the figures of the accompanying drawings and in which like reference numerals refer to similar elements and in which:

FIG. 6 is a screenshot of an example graphical user interface used to register an MFP device with an activation server.

DETAILED DESCRIPTION

Figure 1:
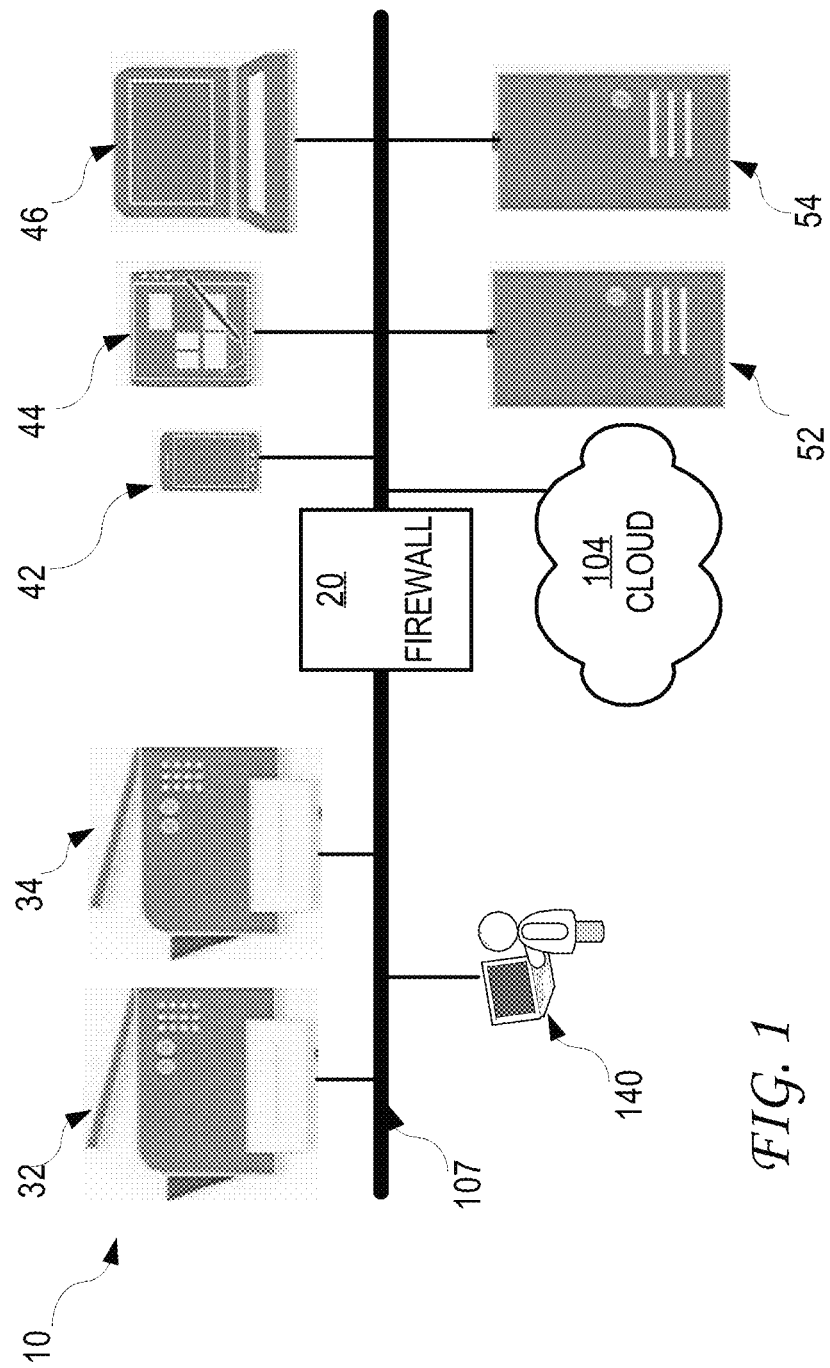
FIG. 1 is a block diagram that depicts an example multi-MFP device system architecture for activating and updating a cloud application based on a registration status of an MFP device.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. SYSTEM ARCHITECTURE
   A. Multi-MFP Device Configuration
   B. Example Configuration
III. ACTIVATION AND UPDATE SERVICE FOR A CLOUD APPLICATION
   A. Example Workflow for Testing Prerequisite Conditions for Activating and Updating a Cloud Application
   B. Registering an MFP Device as a Cloud Printer
   C. Testing Whether an MFP Device Has Been Registered
   D. Example Workflow for Activating and Updating a Cloud Application
   E. Example of Application Registration Interface
   F. Example of Application Activation Interface
IV. IMPLEMENTATION MECHANISMS I. Overview Techniques are provided for activating and updating a cloud application with an activation server. The approach allows managing availability of a cloud application at an MFP device regardless of whether executing the application requires a user license or not.

In an embodiment, if a user sends a request to register a cloud application from an MFP device, then the system checks if the MFP device has been registered with the activation server, and if so, redirects a user to the cloud application registration process. However, if the MFP device has not been registered with an activation server, then the system recommends for example, that the user registers the MFP device with the activation server first. Registering of the MFP device with the activation server is a prerequisite to the registering of the cloud application.

Implementing the presented approach allows controlling execution of cloud applications on an MFP device including controlling of the execution of those applications for which an executable has been distributed to users free of charge and/or without imposing a license requirement.

Techniques are provided for activating and updating a cloud application for execution on an MFP device. Examples of cloud applications include external Web service applications available to users from an MFP device. For instance, cloud applications may include a cloud printing application that may be launched from an MFP device, or a cloud application for storing image data of documents scanned by an MFP device.

In an embodiment, a user launches from an MFP device an application registration application to activate and/or update a cloud application. Registering of a cloud application usually involves enabling an execution of the cloud application on the MFP device. However, if a particular cloud application is designed to be executed without a user license, then without the presented approach, a vendor of the MFP device may remain unaware of the fact that the particular cloud application is executed on the MFP device.

To control an execution of a cloud application on an MFP device, the system tests whether the MFP device has been registered with an activation server. If the MFP device has been registered with the activation server, then an application registration application allows the user to register the cloud application and thus enable the control of the execution of the cloud application. However, if the MFP device has not been registered with the activation server, then the application registration application prompts the user to register the MFP device with the activation server before an activation of the cloud application may be performed.

In an embodiment, an application registration application executed at an MFP device receives a registration request to register a particular application with an activation server. The particular application is any type of software application that uses or invokes at least one external Web service.

In response to receiving a registration request, an application registration application obtains a device identification of the MFP device. The device identification of the MFP device may be any type of a device identifier, such as a machine serial number, a machine manufacturer code, a device model name, and the like.

In an embodiment, an application registration application generates a verification request, includes a device identification in the verification request, and transmits the verification request to an activation server to cause the activation server to generate and send to the application registration application a response indicating whether the MFP device has been registered with the activation system.

Once an application registration application receives a response from an activation server to a verification request, the application registration application determines whether the response indicates that the MFP device has been registered with the activation server.

If the response indicates that the MFP device has been registered with an activation server, then an application registration process proceeds to registering the cloud application with the activation server to allow users to launch the cloud application from the MFP device.

However, if the response indicates that the MFP device has not been registered with an activation server, then an application registration application displays a recommendation message on a display of the MFP device without allowing the registration of the cloud application at that time. The recommendation message may indicate recommendations to register the MFP device with the activation server or purchase a license for using the particular application from the MFP device.

II. System Architecture

A. Multi-MFP Device Configuration

FIG. 1 is a block diagram that depicts an example multi-MFP device system architecture 10 for activating and updating a cloud application based on a registration status of an MFP device.

System 10 includes a plurality of MFP devices 32, 34, one or more user workstations 140, one or more security devices 20, and a communication network 107, which allows users of MFP devices 32, 34 and of user workstations 140 to communicate with external cloud services provided by a cloud network 104, servers 52, 54 and other devices, such as one or more smart phones 42, one or more tablets 44, one or more laptops 46, and the like. System 10 may include other devices and communications links not depicted in FIG. 1, or may include some, but not all, devices and communications links depicted in FIG. 1.

In an embodiment, servers 52, 54 are activation servers managed and provided by manufacturers or vendors of MFP devices 32, 34. Servers 52, 54 may be for example, external activation servers that are communicatively coupled to MFP devices 32, 34, user workstations 140 and other user devices 42-46.

Activation servers 52, 54 may be configured to provide user interfaces and functionalities that allow system administrators and users to manage device status of MFP devices 32, 34. For example, activation servers 52, 54 may be equipped with functionalities for adding an MFP device to a registration database maintained by an activation server, deleting an MFP device from the registration database, suspend accessibility of an MFP device, modify a status of an MFP device in the registration database, testing the status of an MFP device in the registration database, and the like.

Activation servers 52, 54 may be configured to provide activation services for multiple applications, including services to activate, with external servers, cloud applications to be executed on MFP devices 32, 34.

Communications between devices depicted in FIG. 1 and activation servers 52, 54 may be exchanged using any communications protocol, including the Internet Protocol (IP), Transmission Control Protocol (TCP), TCP/IP, Simple Mail Transfer Protocol (SMTP), and the like.

Users may use any of MFP devices 32, 34, user devices 42-46, and user workstations 140 to create, retrieve and execute print jobs. MFP devices 32, 34, user devices 42-46, and user workstations 140 may be installed in multiple network. In some embodiments, no two devices need to be on the same network. The networks may be secured by one or more security devices, such as a firewall 20, or other devices.

In an embodiment, system 10 depicted in FIG. 1 allows users to access MFP devices 32, 34, and launch various applications from MFP devices 32, 34. The users may access MFP devices 32, 34 directly or indirectly (for example, via one or more local and remote computer networks). For instance, a user may access any of MFP devices 32, 34 directly by approaching any of the devices 32, 34, and use a user interface implemented in the device to launch applications from the device. According to another example, a user may access a workstation 140 connected to a local network 107, and via network 107 access any of MFP devices 32, 34 to launch the applications. According to yet other example, a user may access tablet 44, request a remote access to any of MFP devices 32, 34, and once the access is granted, launch the applications from the device.

In an embodiment, communications exchanged between MFP devices 32, 34, user devices 140 and a firewall 20 are considered to be local with respect to firewall 20, while communications exchanged between smart phone 42, tablet 44, laptop 46, servers 52, 54 and firewall 20 are considered to be remote with respect to firewall 20. Hence, if a user of device 140 attempts to access any of servers 52, 54 via firewall 20, then the communications exchanged between the user and the server are remote with respect to firewall 20. Furthermore, if a user of device 140 attempts to access via firewall 20 any of cloud services available in cloud 104, then the cloud service accessed by the user is considered an external Web service, or an external cloud service. Examples of external cloud services (also referred to as cloud services) include cloud printing, and other cloud services, such as Google™ Cloud Printing, and the like.

In an embodiment, a user accesses MFP device 32 (using any method described above), and launches an application registration application on MFP device 32 to register a cloud application to be able to execute the cloud application service from MFP device 32. Depending on whether MFP device 32 has been registered with an activation server 52, the application registration application either permits the registration of the cloud application with the activation server, or recommends that the user registers the MFP device 32 with the activation server 52 before the registration of the cloud application may be performed.

B. Example Configuration

Figure 2:
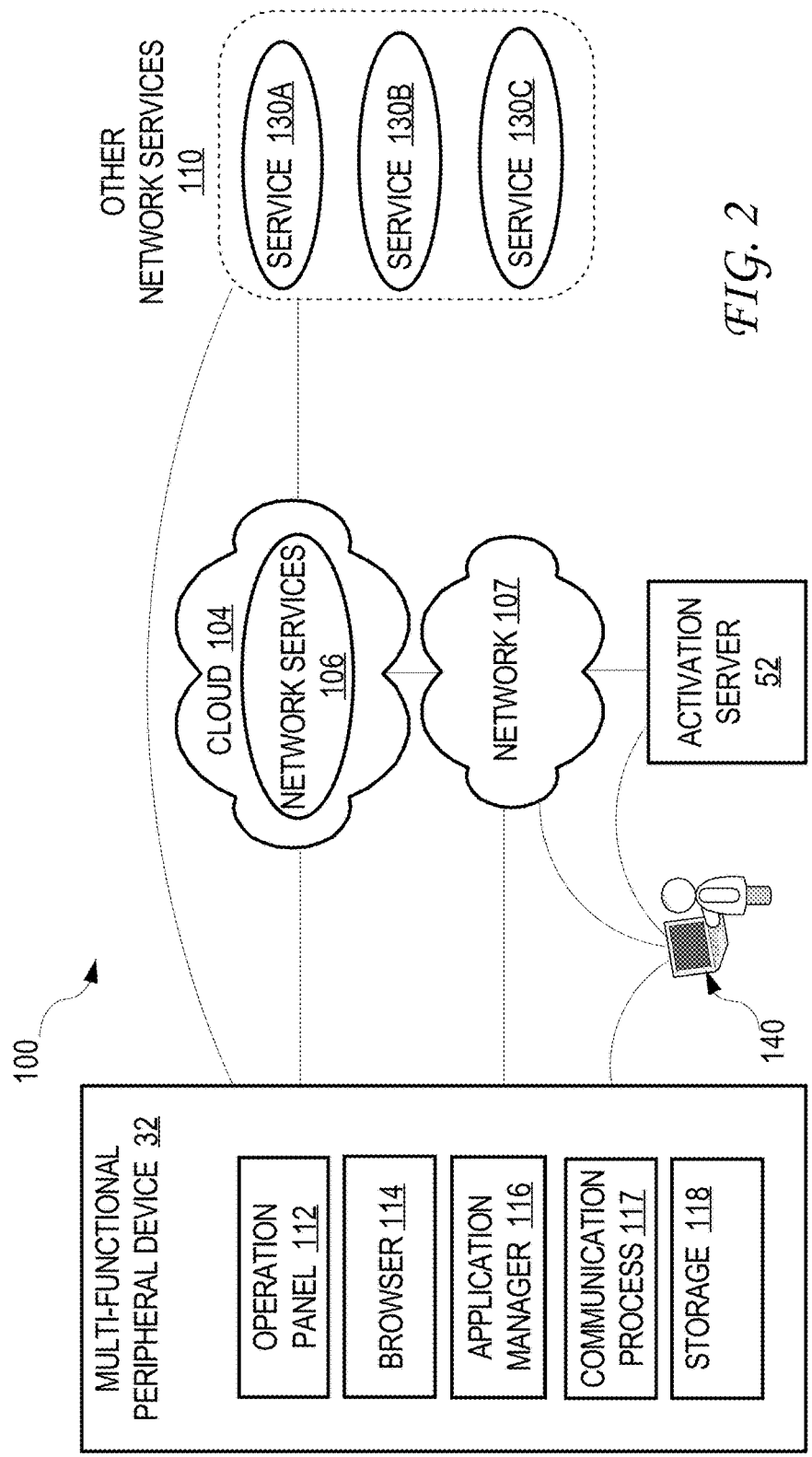
FIG. 2 is a block diagram that depicts an example system architecture for activating and updating a cloud application based on a registration status of an MFP device.

FIG. 2 is a block diagram that depicts an example system architecture 100 for activating and updating a cloud application based on a registration status of an MFP device 32.

System 100 includes an MFP device 32, a cloud network 104 (also referred to as a cloud 104), a network 107, an activation server 52, and other network services 110. Although FIG. 2 depicts only one MFP device 32, system 100 may include additional MFP devices, as those depicted in FIG. 1. Furthermore, although FIG. 2 depicts only one activation server 52, system 100 may include additional servers, as those depicted in FIG. 1. Moreover, although FIG. 2 depicts only one user device 140, system 100 may include additional user devices, as those depicted in FIG. 1.

MFP 32 is a device configured to perform a set of specialized functions that may include, without limitation, printing, copying, scanning, sending and receiving facsimiles, and the like. MFP 32 may be configured with a document processing logic for performing a set of one or more processing functions with respect to document data received from MFP 32 or from other network devices. Example functions may include, without limitation, performing optical character recognition (OCR) for scanned image data generated by MFP 32, generating print data, and formatting and/or otherwise manipulating document data. Document data, as used herein, refers to data representing any portion of an electronic document. The format of the data may vary from implementation to implementation depending on the format of the document. For example, the document data may include, without limitation, data for an image file, word processor file, spreadsheet file, portable document format (PDF) file, and the like.

MFP 32 includes a user interface (UI) configured to generate various displays, including for example, an operation panel 112. The UI is configured to receive input from users of MFP device 32 and to generate output for the user. The UI may generate displays for, without limitation, a control panel, a display panel, a touchscreen, one or more physical buttons, and the like. For example, MFP device 32 may receive, without limitation, graphical UI (GUI) data to be displayed for an end user. Additionally or alternatively, the UI may include a card reader, such as a radio frequency identifier (RFID) card reader or other smartcard reader, for receiving card identifiers, MFP authentication credentials and/or other MFP user identification data from an MFP user.

MFP device 32 may also comprise a browser 114 for interacting with network services 106 hosted by cloud 104 and/or other network services 110. MFP users may access browser 114 using the UI, to navigate and connect with network services 106 and/or other network services 110. Browser 114 executed on MFP device 32 may be any type of browser, including a limited-capability browser that does not comply with one or more Web standards. For example, the browser may not fully support authorization protocol standards, such as the OAuth protocol.

Browser 114 executed on MFP device 32 may interact with network services 106 to provide a set of one more functionalities to MFP device 32. Network services 106 may reside on a cloud platform 104 implemented in a variety of ways. For example, network services 106 may be implemented by one or more print servers and/or one or more Web servers executing on one or more network devices.

Browser 114 executed on MFP device 32 may also interact with other network services 110 to provide additional external functionalities to MFP device 32. Other network services 110 may be implemented in various servers and/or printing platforms, and may include one or more services, such as a service 130A, a service 130B, and a service 130C.

Network services 106, 110 include one or more Web cloud services provided by one or more service providers different than MFP device 32. Network services 106, 110 may comprise one or more processes implemented on a cloud platform. The architecture of the cloud platform may vary from service to service and from service provider to service provider. Network services 106, 110 may correspond to a variety of different services including, without limitation, email services such as Gmail™ and Yahoo!™ Mail, cloud storage services such as Google™ docs and Dropbox™, expense reporting services such as Concur and Shoeboxed, database cloud services such as Amazon S3 and Oracle Cloud, Software-as-a-Service (SaaS), Platform-as-a-Service (PaaS), Infrastructure-as-a-Service (IaaS) offerings, and the like.

Browser 114 may facilitate access to network 107 and/or activation server 52. For example, using a user device 140, a user may access MFP device 32, launch browser 114 and then an application registration application. Using the application registration application, the user may try to register a cloud application to enable access to any of network services 106 on cloud 104. According to another example, using a user device 140, a user may access MFP device 32, launch browser 114, and then a device registration application, and using the device registration application try to register MFP device 32 with activation server 52.

In an embodiment, MFP device 32 comprises an application manager 116. Application manager 166 may be configured to provide an interface through which a user may register devices and applications, and through which a user may access network services 106 and other network services 110.

Application manager 116 may include one or more MFP Web applications that communicate with browser 114 on MFP device 32 and connect with network services 106, 110. An MFP Web application may perform a particular function or set of functions, and may facilitate communications with one or more network services 106, 110. Example functions that may be performed by an MFP Web application include, without limitation, sending document data received from MFP device 32 to a corresponding network service, storing document data received from MFP device 32 to a corresponding network service, performing document processing functions using document processing logic for a network service and/or MFP device 32, sending document or print data received from an external Web service to MFP device 32, and the like.

Depending on the particular implementation, there may be a one-to-one mapping between MFP Web applications implemented in MFP device 32 and external network services 106, 110, or a one-to-many mapping. For example, there may be different MFP Web applications for accessing email services, cloud storage services, expense reporting services, and the like. In addition or alternatively, a single MFP Web application may be used to access any combination of external network services.

MFP Web applications may also be referred to as connector applications because they facilitate connecting MFP device 32 to external network services 106, 110, and allow users of MFP device 32 to access external services.

In an embodiment, MFP device 32 also comprises a communication process 117 for facilitating communications to and from MFP device 32.

MFP device 32 may also comprise one or more storage units 118, implemented in volatile or non-volatile storage media. The type of media used as storage 118 depends on the implementation of MFP device 32.

III. Activation and Update Service for a Cloud Application

According to embodiments described herein, an activation and update service for a cloud application is provided. The service allows registering a cloud application if an MFP device on which the cloud application is to be executed is registered with an activation server.

Figure 3:
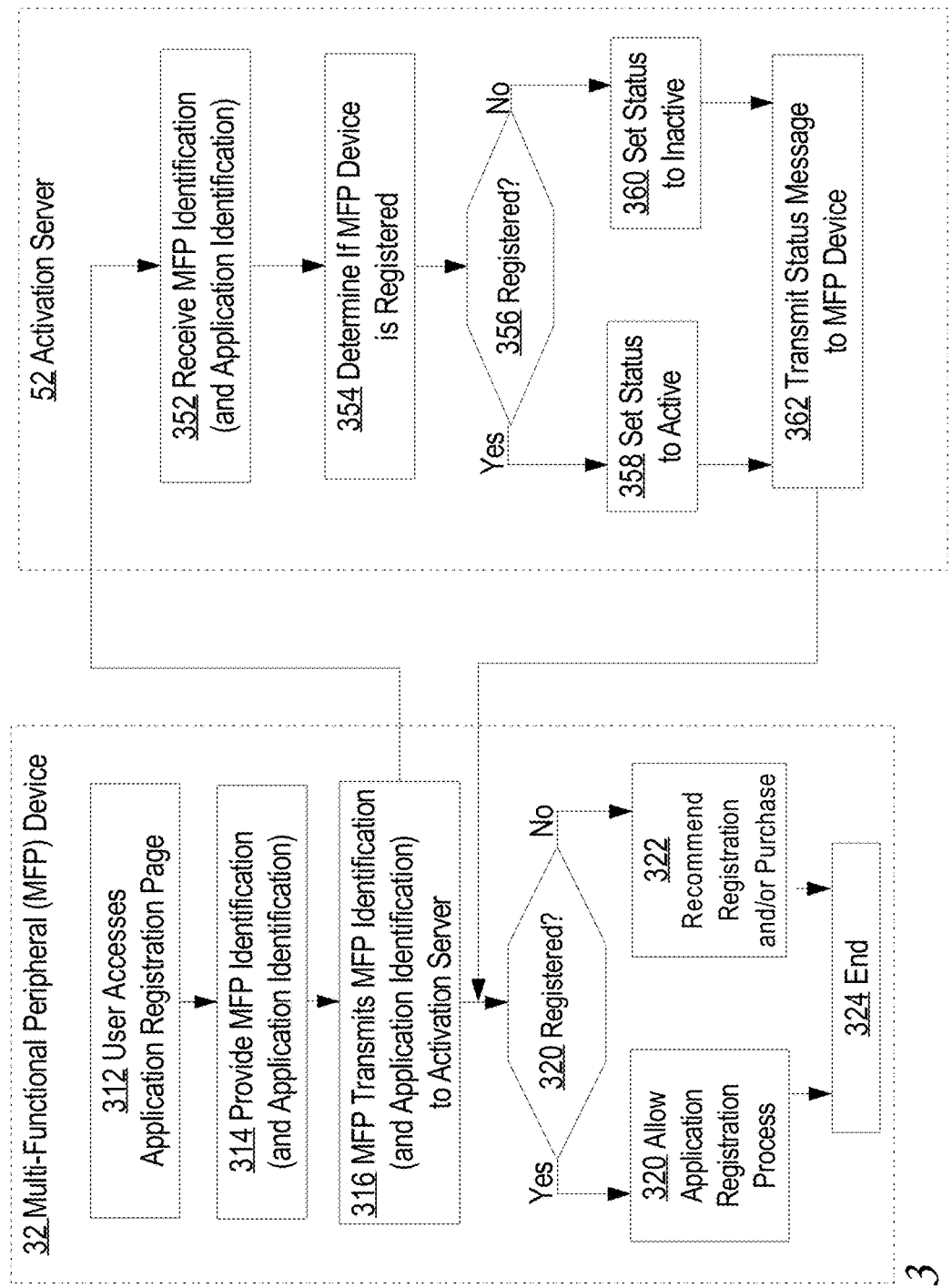
FIG. 3 is a block diagram that depicts an example workflow overview for testing prerequisite conditions for activating and updating a cloud application based on determining whether an MFP device has been registered with an activation server.

A. Example Workflow for Testing Prerequisite Conditions for Activating and Updating a Cloud Application FIG. 3 is a block diagram that depicts an example workflow overview for testing prerequisite conditions for activating and updating a cloud application based on determining whether an MFP device 32 has been registered with an activation server 52.

The process of testing prerequisite conditions for activating and updating a cloud application includes registering the cloud application with an activation server. However, before the cloud application can be registered with an activation server, the system tests whether MFP device 32, from which the cloud application is to be launched, has been registered with the activation server. The steps executed during the activation of a cloud application depend on whether MFP device 32 has been already registered with the activation server.

In an embodiment, the process of activating and updating a cloud application begins at MFP device 32, from which a user invokes an application registration application. The process involves the cooperation between the application registration application launched from MFP device 32 and applications executed on activation server 52.

In an alternative embodiment, the process begins at user workstation 140 (not depicted in FIG. 3), from which a user invokes an application registration application and which communicates with MFP device 32. This process involves the cooperation between the application registration application launched from user workstation 140 with one or more applications executed on MFP device 32, and the applications executed on activation server 52.

It is also possible to start the process of activating and updating a cloud application from user workstation 140, from which a user accesses MFP device 32 and launches an application registration application. This process involves the cooperation between the application registration application launched remotely and activation server 52.

Referring again to FIG. 3, in step 312, a user launches an application registration application, and accesses an application registration page provided by the application registration application. This may be accomplished using a variety of methods and approaches. For example, using a user interface of MFP 32, an MFP user requests access to MFP Web application registration application 116 (depicted in FIG. 2). The application registration application may use external Web services 110. In response, MFP device 32 generates and sends an access request to MFP Web application registration application 116. Upon receiving the access request, MFP Web application registration application 116 displays instructions to the user. The instructions may include a request for providing an identification of MFP device 32. Alternatively, a user may use a user device 140 (depicted in FIGS. 1-2), and from user device 140 launch an application registration application to access an application registration page. Once accessed, the application registration page may display instructions for the user. The instructions may include a request to provide an identification of MFP device 32.

Depending on the implementation, requesting an identification of MFP device 32 may include a request to provide one or more of the following: a machine identification number of MFP device 32, a machine serial number of MFP device 32, an Internet Protocol (IP) address of MFP device 32, or any other form of identification of MFP device 32.

In step 314, an application registration application displays for a user one or more instructions indicating that an identification of MFP device 32 is to be provided to continue with a registration process of a cloud application. The instructions may specify the type of the identification to be provided, the form in which the identification is to be provided, and the like. For example, the instructions may indicate a request to provide a serial number of MFP device 32. The instructions may also indicate that additionally, or optionally, a model name of MFP device 32, an IP address of MFP device 32, and/or a customer name are to be provided. The instructions may also indicate that a user is to provide a name of a cloud application that is to be registered, a version number or specification of the cloud application, and the like.

In an embodiment, instructions displayed for a user may include a request to provide both an identification of MFP device 32 and an identification of a cloud application that a user is trying to register. Such requests may be displayed when the process tests not only if MFP device 32 has been registered with an activation server, but also whether MFP device 32 has been registered to execute a particular cloud application on MFP device 32. This type of testing is more complex than the mere testing whether MFP device 32 has been registered with an activation server.

In step 316, a user provides data comprising an identification of MFP device 32 to an application registration application, and causes the application registration application to transmit the data containing the identification of MFP device 32 to activation server 52.

In step 352, activation server 52 receives data containing an identification of MFP device 32, and optionally, or additionally, data containing an identification of a cloud application that a user is trying to register. The identification of cloud application server may be used when a cloud application is actually registered. The process of the actual registering of a cloud application service is described in detail in FIG. 4.

Figure 5:
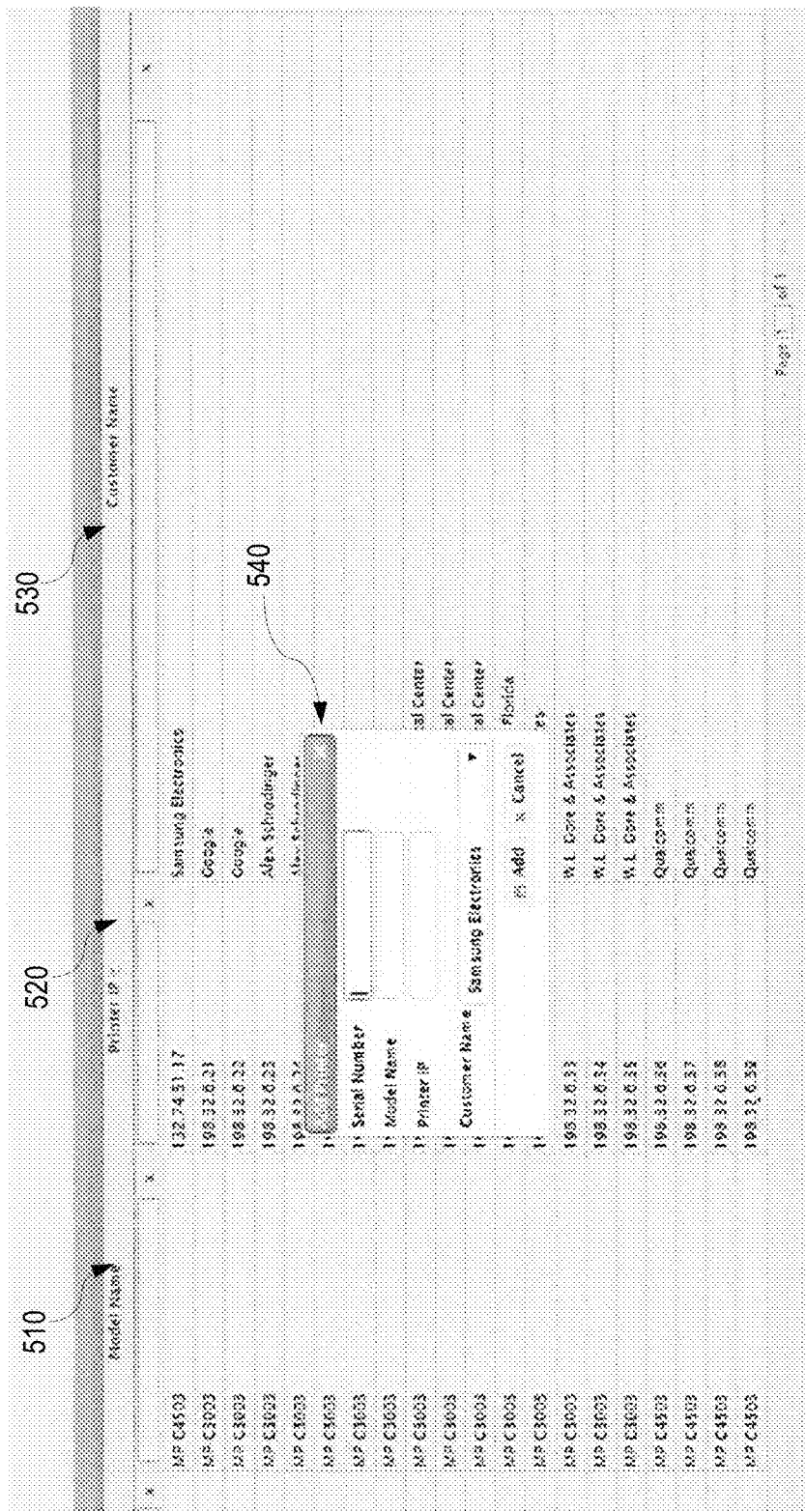
FIG. 5 is a screenshot of an example graphical user interface used to register an MFP device with an activation server.

Referring again to FIG. 3, upon receiving data containing an identification of MFP device 32, in step 354, activation server 52 uses the received data to determine whether MFP device 32 has been registered with the activation server. This may be accomplished using various methods. For example, activation server 52 may retrieve, from a database, a data file that contains registration records of devices that have been already registered with the activation server. Examples of such records are depicted in FIG. 5.

A data file containing registration records of devices that have been registered with activation server 52 may be implemented in the Structured Query Language (SQL) data structures and databases, or any of the data structures designed to store searchable data.

Upon retrieving a data file that contains registration records of devices that have been registered with activation server 52, activation server 52 uses the received data containing the identification of MFP device 32 as a search query to determine whether the received identification is present in the data file. For example, the identification may be used as a key in a SQL search query, and the search query may be issued with respect to the SQL data file. The data file may be searched using the SQL query to generate search results indicating that a record containing the identification of MFP device 32 is either found in the data file or not.

If a record containing the identification of MFP device 32 is found in a data file containing registration records of devices registered with activation server 52, then activation server 52 may determine that MFP device 32 has been already registered with the server. Otherwise, activation server 52 may determine that MFP device 32 has not been registered with the server.

Other methods of determining whether MFP device 32 has been registered with an activation server may also be implemented.

Once activation server 52 determines whether MFP device 32 has, or has not, been registered with the server, in step 356, activation server 52 generates a status message. A status message may be created in any known format and its purpose is to indicate whether MFP device 32 has, or has not, been registered with the server. For example, a status message may be an SMTP message carrying status information indicating that MFP device 32 either has been registered with activation server 52, or has not been registered with activation server 52.

If MFP device 32 has been registered with activation server 52, then in step 358, activation server 52 creates a status message to indicate that MFP device 32 has been registered with the server.

However, if MFP device 32 has not been registered with activation server 52, then in step 360, activation server 52 creates a status message to indicate that MFP device 32 has not been registered with the server.

In an embodiment, a status message may indicate that for some reason, the determination was unsuccessful, and it is unknown whether MFP device 32 has been registered with activation server 52. For example, the process tried to determine whether MFP device 32 has been registered with activation server 52, but activation server 52 was down and the determination was unsuccessful. The process may continue checking until it is determined whether MFP device 32 is registered with any other activation server accessible to MFP device 32.

In step 362, activation server 52 transmits a status message to MFP device 32, or to user device 140. Whether the status message is transmitted to MFP device 32 or to user device 140 depends on whether a user launched an application registration application from MFP device 32 or from user device 140.

In step 318, an application registration application receives a status message from activation server 52, and determines contents of the status message. The contents may indicate that MFP device 32 has been registered with activation server 52, or that MFP device 32 has not been registered with activation server 52. In some situations, a status message may indicate that it is unknown whether MFP device 32 has been registered with the server.

If MFP device 32 has been registered with activation server 52, then the process proceeds to step 320, in which an application registration application allows a user to register a cloud application service. The process is further described in FIG. 4.

However, if a status message indicated that MFP device 32 has not been registered with activation server 52, then the process proceeds to step 322, in which an application registration application generates and displays recommendations for the user to register MFP device 32 with the activation server before the cloud application service may be registered. Alternatively, or additionally, the application registration application may generate and display a message recommending that the user purchases a copy of a cloud application that enables the cloud application services.

In step 324, the process of testing prerequisite conditions for registering a cloud application based on a registration status of MFP device 32 is completed.

A user may repeat the steps described above each time the user attempts to register a cloud application from MFP device 32 or from user device 140. The process may also be repeated each time a status of MFP device 32 is changed or identification information of MFP device 32 is changed.

Once the process of testing prerequisite conditions for registering a cloud application based on a registration status of MFP device 32 is completed, and it has been determined that MFP device 32 has been registered with activation server 52, the process proceeds to register the cloud application. An application registration process is described in detail in FIG. 4.

However, if it has been determined that MFP device 32 has not been registered with activation server 52, then the process recommends registering MFP device 32.

b. Registering an MFP Device as a Cloud Printer

In an embodiment, before a cloud application is available from an MFP device 32, the process tests whether MFP device 32 is registered as a cloud printer. For example, if a user wishes to launch a cloud printing application service from MFP device 32, the process may first test whether MFP device 32 is registered as a cloud printer, such as a Google™ Cloud Printer, and only if MFP device 32 is registered, the process may proceed to registering the cloud application.

A printing device is usually registered by a manufacturer technician or a vendor technician when the printing device is purchased and a payment for the device is received. At that time, a technician enters information about the printing device to a database stored in one or more external servers, and updates a status of the device once the payment is received. For example, once a payment for leasing a printing device is received, a technician may update the status information about the device in the database to indicate that the device is a "paid" device, or an "active" device. Other forms of updating a status of a printing device in a vendor database or a manufacturer database may also be implemented.

FIG. 5 is a screenshot of an example graphical user interface used to register an MFP device with an activation server. The screenshot shows an interactive dialog text box 540 that allows a user to create a registration record for a device. Alternatively, dialog text box 540 may be used to enter information about a device whose record is to be deleted from a registration database.

Dialog box 540 may be displayed as an overlay on the top of a display of data corresponding to registration records of already registered devices. In an embodiment, dialog box 540 is configured to display text boxes into which a user may enter data corresponding to a device that a user wishes to register. In the example depicted in FIG. 5, dialog box 540 allows a user to enter a serial number of the device, a model name of the device, an IP address of the device, and a customer name of the device. Some of the text boxes may accept user-provided alphanumerical strings, while other text boxes may have associated pull-out menus that provide choices which the user may select and have entered into the text box. Other organization of dialog box 540 may also be implemented.

Dialog box 540 may also have one or more buttons which are used to perform certain actions. For example, upon entering identification data of MFP device 32 into dialog box 540, a user may select either an "add" button or a "cancel" button. If the "add" button is selected, then the system may use the identification data provided by the user to create a registration record for MFP device 32, and save the registration record in a registration database. However, if the "cancel" button is selected, then the system may use the identification data provided by the user to determine whether a registration record having the provided identification data exists in the registration database, and if so, to delete such a registration record. Other types of buttons and other types of functionalities may also be implemented in dialog box 540.

In an embodiment, dialog box 540 is displayed as an overlay on the top of a display of registration records data organized in a data table.

In the example depicted in FIG. 5, dialog box 540 is displayed as an overlay on the top of a table having rows and columns for storing and organizing registration records data. A column in the table has a label indicting the type of information stored in a data field in the corresponding column. The example depicted in FIG. 5 shows only some of the columns of the registration table. The depicted columns include a model name column 540, a printer IP address column 520, and a customer name column 530. Other labels and columns may be included in a registration table.

A row in the table is used to store a registration data record for a device. Each registration data record includes data fields, and each data field is configured to store data. In the depicted example, a registration record for a device includes at least data indicating a model name of the device, an IP address of the device, and a customer name who uses the device. Other organizations of data fields and data records may also be implemented. Another example of a device registration table is depicted in FIG. 6.

Figure 6:
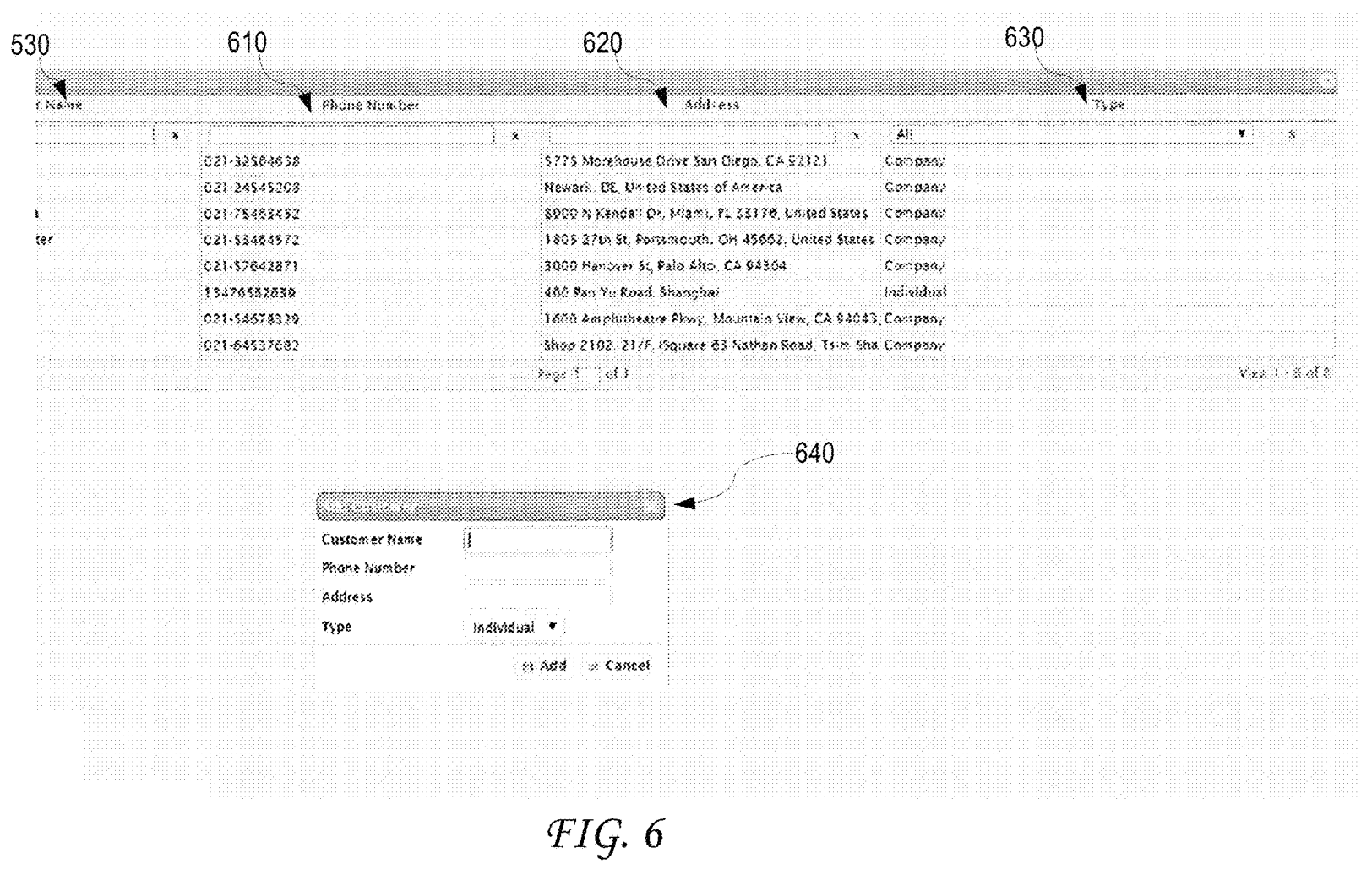

FIG. 6 is a screenshot of an example graphical user interface used to register an MFP device with an activation server. The screenshot shows an interactive dialog text box 640 that allows a user to add information to a registration record created for a device using the approach described in FIG. 5. Alternatively, dialog text box 640 may be used to enter information about a device whose record is to be deleted from a registration database.

The screenshot depicted in FIG. 6 may be viewed as an extension to the screenshot and capabilities described in FIG. 5. For example, dialog box 640 may be displayed after a user entered data to dialog box 540 depicted in FIG. 5. Dialog 640 may allow the user to enter additional data about a device that the user wishes to register, or have already registered. The additional data may be stored in a registration table in addition to the data provided using dialog box 540.

In an embodiment, dialog box 640 may be displayed as an overlay on the top of a display of data corresponding to registration records of already registered devices. Dialog box 640 may be configured to display text boxes into which a user may enter additional data corresponding to a device that the user wishes to register, or have already registered. For example, dialog box 640 may allow a user to enter a customer name of a user who uses the device, a customer phone number, a customer address, and a customer type. Some of the text boxes may accept user-provided alphanumerical strings, while other text boxes may have associated pull-out menus that provide choices that the user may select and have entered into the text box. Other organizations of dialog box 640 may also be implemented.

Dialog box 640 may also have one or more buttons which are used to perform certain actions. For example, upon entering identification data of MFP device 32 into dialog box 640, a user may select either an "add" button or a "cancel" button. If the "add" button is selected, then the system may use the identification data provided by the user to update a registration record for MFP device 32, and save the registration record in a registration database. However, if the "cancel" button is selected, then the system may use the identification data provided by the user to determine whether a registration record having the provided identification data exists in the registration database, and if so, delete such a registration record. Other types of buttons and other types of functionalities may be implemented in dialog box 640.

In an embodiment, dialog box 640 is displayed as an overlay on the top of a display of registration records data. In the example depicted in FIG. 6, dialog box 640 is displayed as an overlay on the top of a table having rows and columns for storing and organizing registration records data. The depicted columns include a customer name column 530, a phone number column 610, an address column 620, and a user type column 630. Other organizations of data fields and data records may also be implemented.

C. Testing Whether an MFP Device has been Registered

To test whether MFP device 32 is registered as a cloud printer, a user (a system administrator or a vendor's technician) may use a Web API hosted on an external server, such as an external activation server. For example, if MFP device 32 is provided by Ricoh Corp. Ltd., of Campbell, Calif., then the external activation server may be a Ricoh server, or any other server that is managed by Ricoh Corp, Ltd., or its subsidiary.

In an embodiment, to test whether MFP device 32 is a registered cloud device, a user accesses a device registration application executed on MFP device 32. The user may access the device registration application either directly from MFP device 32, or remotely from user device 140.

Upon accessing a device registration application, a user may be prompted to provide an identification of MFP device 32. The type of identification of MFP device 32 may depend on the implementation of an external server maintained by a vendor of MFP device 32.

Depending on the implementation, a user may be prompted to provide as an identification of MFP device 32 one or more of the following: a serial number of MFP device 32, a manufacturer code of MFP device 32, or the like. Additionally, or alternatively, the user may be asked to provide a model name of MFP device 32, an IP address of MFP device 32, a customer name of the site at which MFP device 32 is installed, and the like. Furthermore, additionally, or alternatively, a user may be asked to provide a phone number of the user of MFP device 32, an address, an indication whether the user is an individual or represents a company or organization, and the like.

Prompts to provide identification information of MFP device 32 may be displayed for a user in dialog boxes provided by a GUI generated by a device registration application. For example, a device registration application may display for a user a sequence of interactive dialog boxes that have dialog buttons and data input boxes. A user may be prompted to enter the requested information to individual text input boxes by typing the information into the boxes. Alternatively, a user may be provided with a GUI that prompts a user to enter the information into data fields provided by the GUI.

Identification information of MFP device 32 is used to determine a status of MFP device 32. For example, the process may use identification information of MFP device 32 to retrieve information about MFP device 32 from a database associated with an external server, and to determine a status of MFP device 32 based on the retrieved information.

A status of MFP device 32 may indicate whether MFP device 32 is a "paid" device, or not. For example, based on a status of MFP device 32, an administrator may determine whether a customer of MFP device 32 has paid a fee for using or leasing MFP device 32, or whether a customer of MFP device 32 has paid a maintenance fee or a service fee, if such apply.

If a status of MFP device 32 indicates that MFP device 32 is a "paid" device, then a user may register MFP device 32 as a cloud printer. For example, a user may register MFP device 32 as a Google™ Cloud Printer, and once that is accomplished, a Google™ cloud service application may be executed from MFP device 32.

In an embodiment, once MFP device 32 is verified as a "paid" device, a user may register a cloud printing application with an external service or an external activation server. For example, a user may download a cloud printing application onto MFP device 32, and activate the application with the activation server. This type of activation may, or may not, involve obtaining and installing a user license for the cloud printing application on MFP device 32.

A user license may not be required for some cloud printing applications that have been disseminated as an open source and without license agreements. Such cloud application may still be successfully registered with an activation server as long as they are to be launched from MFP devices that have been registered with a vendor external server.

D. Example Workflow for Activating and Updating a Cloud Application

Figure 4:
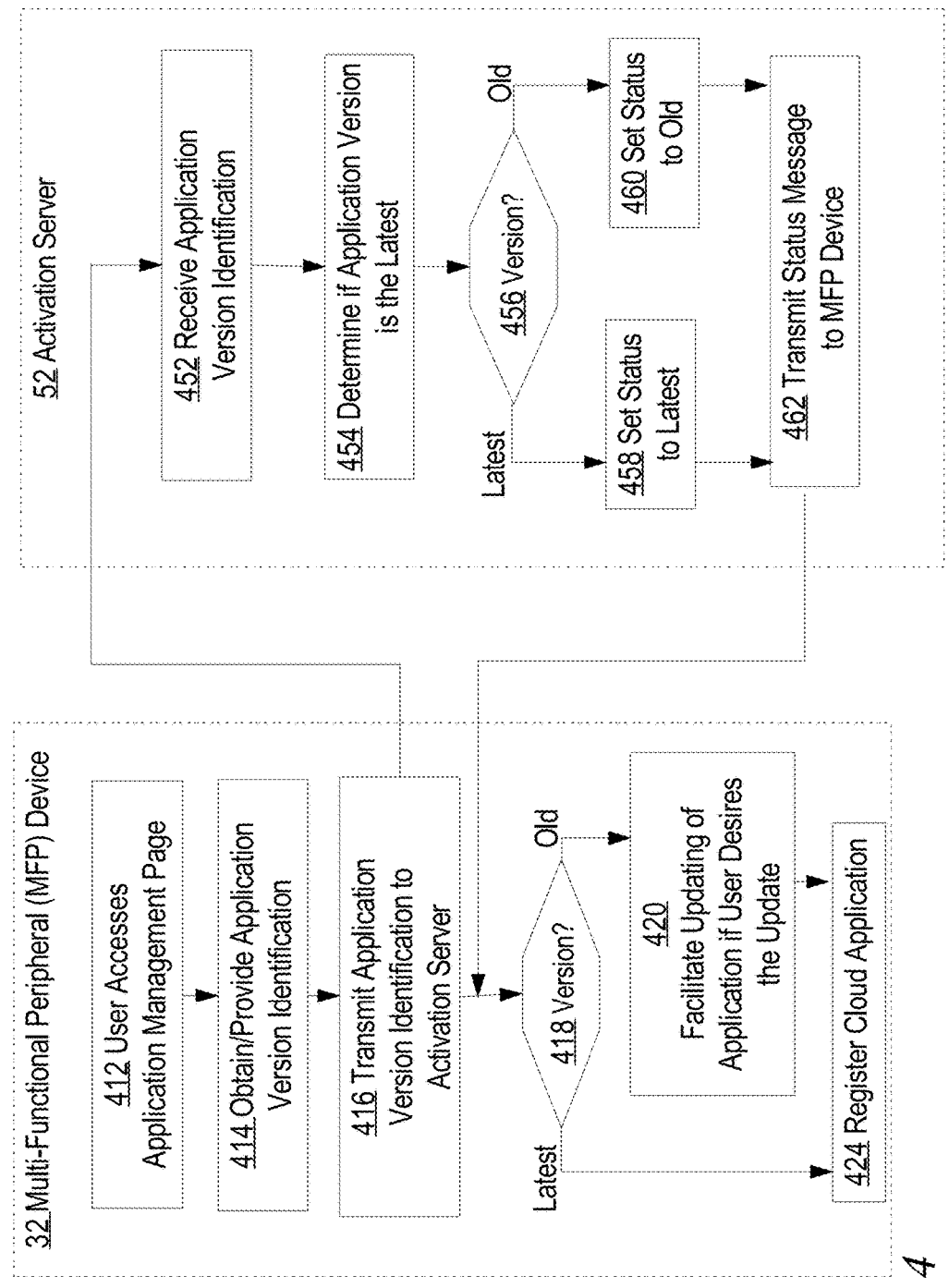
FIG. 4 is a block diagram that depicts an example workflow overview for activating and updating a cloud application based on determining whether an MFP device has been registered with an activation server.

FIG. 4 is a block diagram that depicts an example workflow overview for activating and updating a cloud application based on determining whether an MFP device has been registered with an activation server. The example workflow is applicable once the system determined that MFP device 32, on which the cloud application is to be executed, has been registered with an activation server.

In an embodiment, the process of activating and updating a cloud application begins at MFP device 32, from which a user invokes an application registration application. Alternatively, the process may begin at user workstation 140 (not depicted in FIG. 4), from which a user invokes an application registration application. It is also possible to start the process of activating and updating a cloud application from user workstation 140, from which a user accesses MFP device 32 and launches an application registration application. Execution of the process of activating and updating a cloud application usually involves a cooperation between the application registration application, MFP device 32, and activation server 52.

Referring again to FIG. 4, in step 412, a user launches an application registration application, and accesses an application management page generated by the application registration application. The user may accomplish this by using a user interface of MFP 32 to request access to MFP Web application registration application 116. In response, MFP 32 generates and sends an access request to MFP Web application registration application 116. Upon receiving the access request, MFP Web application registration application 116 displays an application management page and instructions to the user.

Instructions may include a request for providing a version identification of a cloud application service which a user is trying to register and to which the user wishes to have access from MFP device 32.

Depending on the implementation, a version identification of a cloud application may be encoded as an alphanumerical string representing a version of the release of the cloud application. For example, a version identification may be represented as "V6.1.3," or similarly. Non-limiting examples of version identifications are provided in FIG. 7 (column 730).

In an embodiment, a request to provide the version identification of the cloud application specifies the type of information to be provided based on the type of information that is used to register any cloud application service with activation server 52. For example, if registration records maintained for cloud applications registered with an activation server contain the name of the cloud applications and their respective version identifications, then a request may specify that the name of a cloud application and the version identifier be provided to register the cloud application with an activation server.

In an embodiment, by the time the process is directed to an application management page, the process has already verified that MFP device 32 has been registered with an activation server, and an application identifier has been provided to the process. Therefore, at this point, the process may display a request to provide only a version identifier since the application identifier has been already provided and is known.

However, in some implementations, the process may display a request to provide both an application identifier and a version identifier of the cloud application even if a user has already provided the application identifier of the cloud application to be registered.

In step 414, an application registration application displays in an application management page one or more instructions containing a request to provide a version identifier of a cloud application. Alternatively, an application registration application may display instructions containing a request to provide both a version identifier of a cloud application and an application identifier of the cloud application.

In step 416, a user enters the requested information to an application management page generated by an application registration application, and causes the application registration application to transmit the entered information to activation server 52.

In step 452, activation server 52 receives a version identifier of a cloud application, and optionally, or additionally, an identification of the cloud application that a user is trying to register.

Upon receiving a version identification of a cloud application, in step 454, activation server 52 uses the received identification to determine whether the corresponding version of the cloud application is the latest version of the cloud application available (or registered with activation server 52). This may be accomplished using various methods. For example, activation server 52 may retrieve, from a database, a data file that contains application registration records of cloud applications that have been already registered with the activation server.

In step 456, activation server 52 determines that the received identification corresponds to a version of the cloud application that either is, or is not, the latest registered version of the cloud application. If the received identification corresponds to the latest registered version of the cloud application, then the process proceeds to step 458, in which activation server 52 creates a status message which includes an indication that the received identification points to the latest version of the cloud application. However, if the received identification does not correspond to the latest registered version of the cloud application, then the process proceeds to step 460, in which activation server 52 creates a status message which includes an indication that the cloud application that the user is trying to register is not the latest version of the cloud application.

In step 462, activation server 52 transmits a status message to MFP device 32.

Upon receiving a status message at MFP device 32, in step 418, an application registration application determines contents of the status message. The application registration application parses the status message and determines the content of the message. The contents may indicate that the cloud application that a user wishes to register with activation server 52 is the latest version of the cloud application, or that the cloud application is not the latest version of the cloud application. In some situations, a status message may indicate that it is unknown whether any more recent version of the cloud application has been registered with the activation server or known to be released.

If the cloud application that a user wishes to register with activation server 52 is the latest version of the cloud application, then the process proceeds to step 424, in which an application registration application allows a user to register the cloud application.

However, if the cloud application that a user wishes to register with activation server 52 is not the latest version of the cloud application, then the process proceeds to step 420, in which an application registration application generates and displays recommendations for the user to obtain the latest version of the cloud application. If the user accepts the recommendations and downloads the latest version of the cloud application, then the activation registration application may facilitate the download and proceeds to step 424 to register the downloaded latest version of the cloud application.

If the user does not accept the recommendations, then the activation registration proceeds to step 424 to register the cloud application even if its version is not the latest version of the cloud application.

In step 424, an application registration application allows a user to register a cloud application with an activation server. To register the cloud application, a user may be prompted to enter some information about the cloud application to the system, and the application registration application will transmit that information to activation server 52 to create an application registration record. Examples of various types of information that a user may be prompt to enter to register a cloud application with an activation server are described in FIG. 7-8.

The process of registering a cloud application with an activation server is finished when an application registration record has been successfully created and stored for the cloud application at the activation server. The application registration record may be created by an application registration application executed at MFP device 32, or by an application registration application executed on activation server 52.

Upon a successful completion of the application registration process, an application registration application may generate a message indicating the completion. The message may be displayed for a user on a user device, or may be transmitted to the user as an email or a text message.

If the process of registering a cloud application with an activation server is for some reason unsuccessful, an application registration application may generate an error message. The error message may indicate a reason for which the cloud application was not successfully registered if such is known. The error message may also include recommendations for remedial actions for the registration process. The error message is displayed for a user on a user device. The error message may also transmitted to the user as an email or a text message.

E. Example of Application Registration Interface

Figure 7:
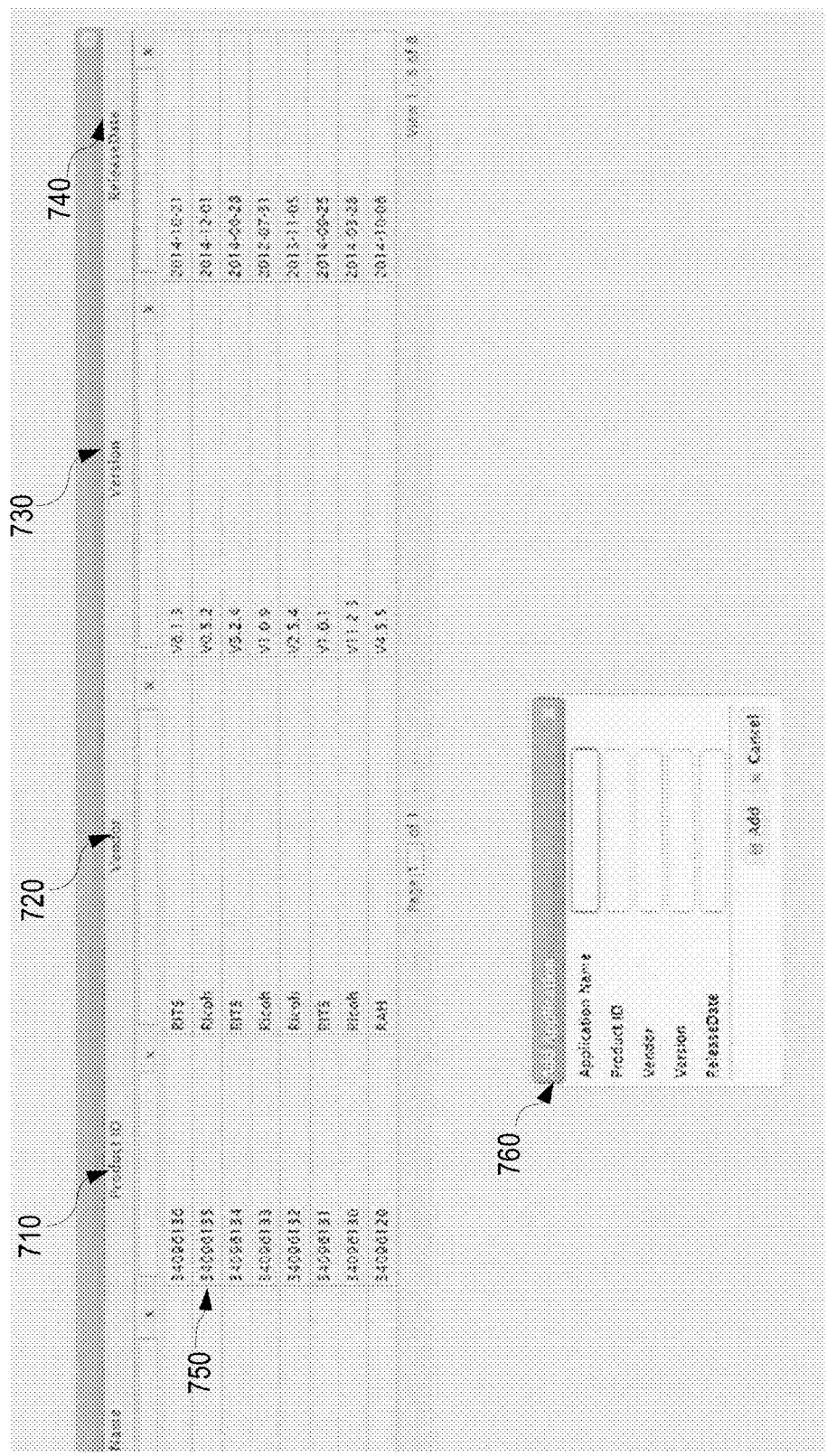
FIG. 7 is a screenshot of an example graphical user interface used to register a cloud application with an activation server.

FIG. 7 is a screenshot of an example graphical user interface used to register a cloud application with an activation server. The depicted screenshot shows one of many possible arrangements of the interface for performing a registration of a cloud application with an activation server.

The screenshot depicted in FIG. 7 shows an interactive dialog text box 760 that allows a user to provide information to be used to create a registration record for a cloud application. Alternatively, dialog text box 760 may be used to enter information about a cloud application whose record is to be deleted from a registration database.

In an embodiment, dialog box 760 may be displayed as an overlay on the top of a display of data corresponding to registration records of already registered cloud applications.

Dialog box 760 may be configured to display text boxes into which a user may enter data corresponding to a cloud application that the user wishes to register, or have already registered. For example, dialog box 760 may allow a user to enter an application name of the cloud application, a product identifier of the application, a vendor name of the application, a version of the application, a release date, and the like. Some of the text boxes may accept user-provided alphanumerical strings, while other text boxes may have associated pull-out menus that provide choices that the user may select and have entered into the text box. Other organizations of dialog box 760 may also be implemented.

Dialog box 760 may also have one or more buttons which are used to perform certain actions. For example, upon entering identification data of a cloud application into dialog box 760, a user may select either an "add" button or a "cancel" button. If the "add" button is selected, then the system may use the identification data provided by the user to either create or update a registration record for the cloud application, and save the registration record in a registration database. However, if the "cancel" button is selected, then the system may use the identification data provided by the user to determine whether a registration record having the provided identification data exists in the registration database, and if so, delete such a registration record. Other types of buttons and other types of functionalities may be implemented in dialog box 760.

In an embodiment, dialog box 760 is displayed as an overlay on the top of a display of registration records data. In the example depicted in FIG. 7, dialog box 760 is displayed as an overlay on the top of a table having rows and columns for storing and organizing registration records data. The depicted columns include a product identifier column 710, a vendor name column 720, a version identification column 730, and a release date column 740.

A registration record 750 stored in a registration database may contain all or at least some data entered into columns 710-740. An example registration record 750 depicted in FIG. 7 contains all data entered into columns 710-740. The record 750 shows that a particular cloud application registered with an activation server has the following attributes: the name of the application is "B4096136," the vendor name is "Ricoh," the version identification is "V0.5.2," and the release date is "2014-12-01." Other registration records may have other data specific to the cloud applications for which the records have been created.

F. Example of Application Activation Interface

Figure 8:
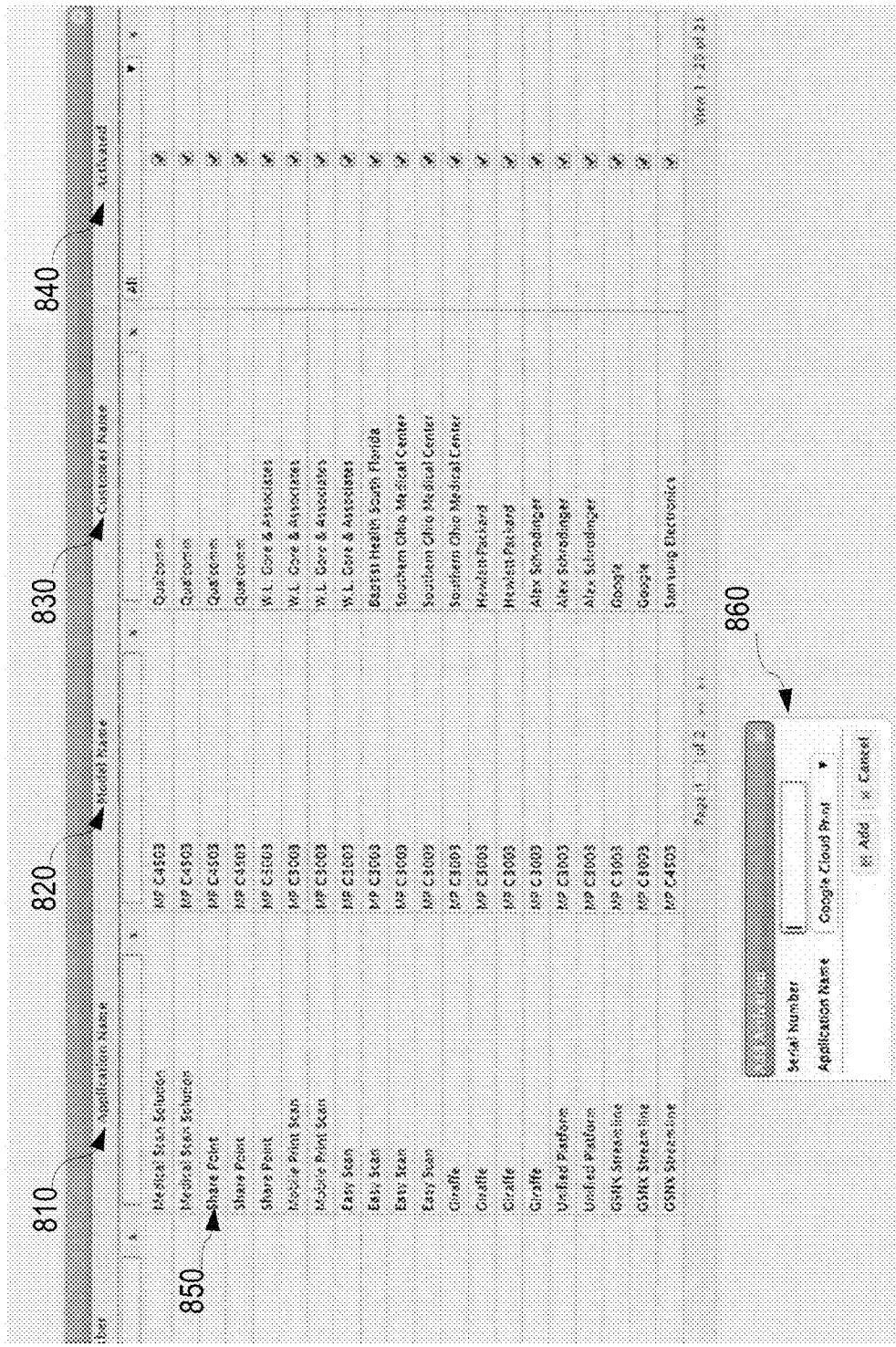
FIG. 8 is a screenshot of an example graphical user interface used to activate a cloud application with an activation server.

FIG. 8 is a screenshot of an example graphical user interface used to activate a cloud application with an activation server. The depicted screenshot shows one of many possible arrangements of the interface for performing an activation of a cloud application with an activation server. The depicted interface may be implemented in systems in which cloud applications are to be activated, not registered, with an activation server. Alternatively, the depicted interface may be implemented in systems in which cloud applications are to be activated in addition to being registered with an activation server.

The screenshot depicted in FIG. 8 shows an interactive dialog text box 860 that allows a user to provide information identifying a cloud application which the user wishes to activate. Alternatively, dialog text box 860 may be used to enter information identifying a cloud application which the user wishes to deactivate or cancel.

In an embodiment, dialog box 860 may be displayed as an overlay on the top of a display of data corresponding to registration records of the cloud applications that have been already activated.

Dialog box 860 may be configured to display text boxes into which a user may enter data corresponding to a cloud application that the user wishes to register, or have already registered. For example, dialog box 860 may allow a user to enter a serial number of the cloud application, and/or an application name. Some of the text boxes may accept user-provided alphanumerical strings, while other text boxes may have associated pull-out menus that provide choices that the user may select and have entered into the text box. Other organizations of dialog box 860 may also be implemented.

Dialog box 860 may also have one or more buttons which are used to perform certain actions. For example, upon entering identification data of a cloud application into dialog box 860, a user may select either an "add" button or a "cancel" button. If the "add" button is selected, then the system may use the identification data provided by the user to activate the cloud application with an activation server. However, if the "cancel" button is selected, then the system may use the identification data provided by the user to deactivate the cloud application. Other types of buttons and other types of functionalities may be implemented in dialog box 860.

In an embodiment, dialog box 860 is displayed as an overlay on the top of a display of records data of cloud applications. In the example depicted in FIG. 8, dialog box 860 is displayed as an overlay on the top of a table having rows and columns for storing and organizing records data of activated cloud applications. The depicted columns include an application name column 810, an application model name column 820, a customer name column 830, and an activation status column 840.

A data record stored for an activated cloud application may contain all or at least some data entered into columns 810-840. An example registration record 850 depicted in FIG. 8 contains all data entered into columns 810-840. The record 850 shows that the "Share Point" application, which has a model name "MP C4503" and has been installed at a "Qualcomm" facility, has been already activated. Other registration records may have other data specific to the cloud applications for which the records have been created.

In an embodiment, the approach is presented for tracking an execution of cloud applications that have been installed on MFP devices without a license. Examples of such applications include various applications designed to facilitate access to cloud-printing services. The approach prevents users from executing such applications an MFP device without a license or a license registration.

In an embodiment, the approach is presented for activating and updating cloud applications to make them available from an MFP device if the MFP device has been registered with an activation server. If the MFP device has been activated with the activation server, then the application registration application allows the user to register the cloud application. Otherwise, the application registration application prompts the user to register the MFP with the activation server, or purchase a license for executing the cloud application.

IV. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
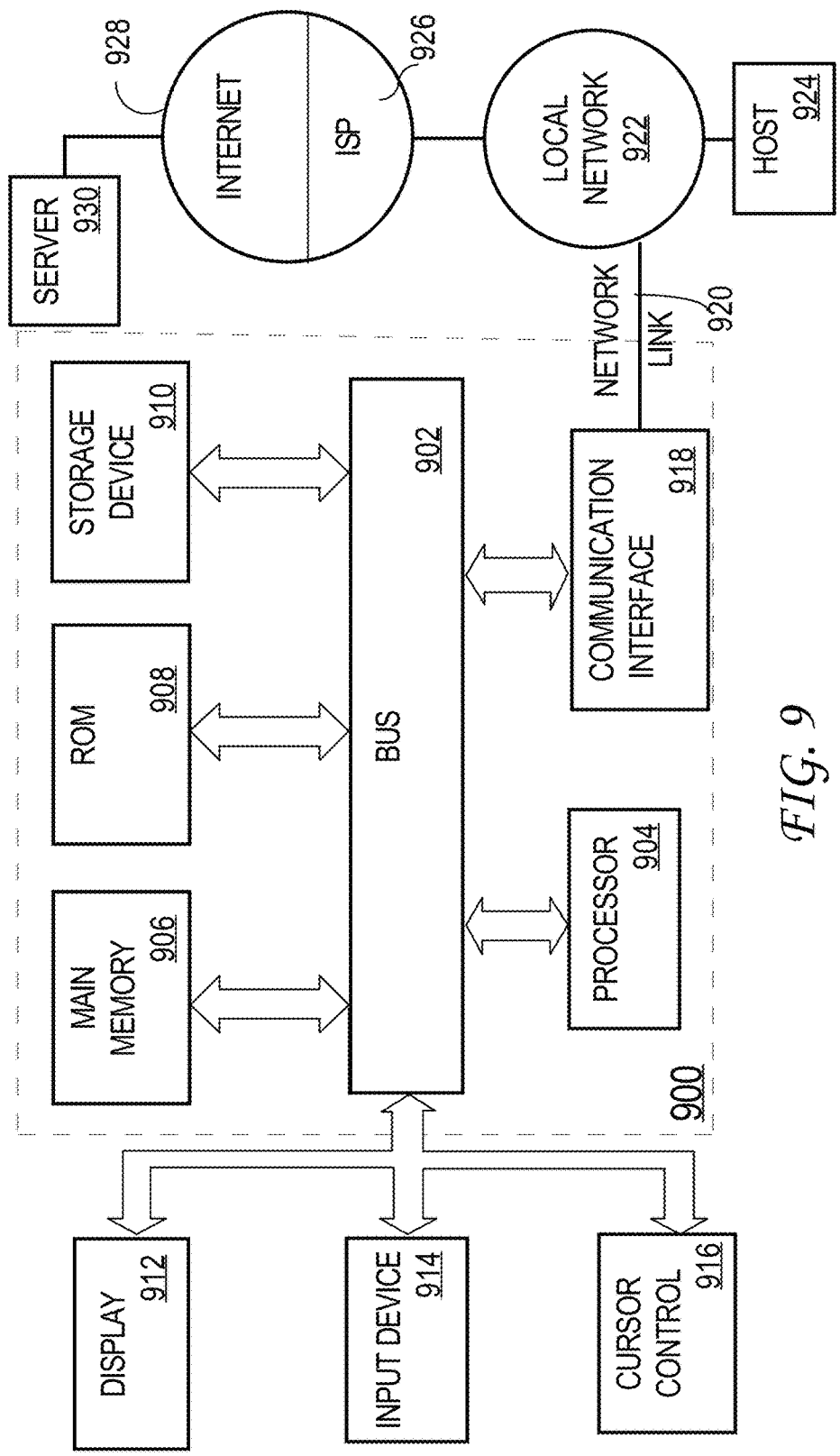
FIG. 9 is a block diagram of a computer system on which embodiments described herein may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions for providing a multi-function peripheral (MFP) device with access to one or more external Web services, wherein processing of the instructions by one or more processors causes:
   receiving, from a user, at an application registration application executing at a MFP device, a registration request to register a particular application with an activation server,
   wherein the particular application is identified in the registration request by both a particular application identifier and a particular application version identifier;
   wherein the particular application uses at least one external Web service;
   in response to receiving the registration request, the application registration application executing at the MFP device performing:
      obtaining a device identification of the MFP device;
      generating a verification request that includes the device identification; and
      transmitting the verification request to the activation server to cause the activation server to generate and send to the application registration application a response indicating whether the MFP device has been registered with the activation server; and
   upon receiving, at the application registration application executing at the MFP device, from the activation server, the response;
      determining whether the response indicates that the MFP device has not been registered with the activation server:
         in response to determining that the response indicates that the MFP device has not been registered with the activation server, displaying a recommendation message on a display of the MFP device;
         in response to determining, by the application registration application executing at the MFP device, that the response indicates that the MFP device has been registered with the activation server:
            determining, by the application registration application executing at the MFP device, whether the particular application version identifier, that is included in the registration request received from the user and that is of the particular application having the particular application identifier, corresponds to a latest version of the particular application having the particular application identifier, available for registration; and
            in response to determining, by the application registration application executing at the MFP device, that the particular application version identifier does not correspond to the latest version of the particular application, having the particular application identifier, available for registration:
               displaying, by the application registration application executing at the MFP device, a notification for the user that a newer version than the particular application version identifier of the particular application, having the particular application identifier, is available for registration.

2. The one or more non-transitory computer-readable media of claim 1, wherein the recommendation message indicates recommendation to purchase a license for using the particular application from the MFP device.

3. The one or more non-transitory computer-readable media of claim 1, wherein processing of the instructions by the one or more processors causes, upon receiving, at the application registration application from the activation server, the response indicating that the MFP device has been registered with the activation server, proceeding to registering the particular application with the activation server.

4. The one or more non-transitory computer-readable media of claim 3, wherein processing of the instructions by the one or more processors causes:
   obtaining an application identification of the particular application to be registered with the activation server;
   generating a verification request comprising the device identification and the application identification; and
   transmitting the verification request to the activation server to cause the activation server to generate and send to the application registration application an answer indicating whether the application identification indicates the latest version of the particular application.

5. The one or more non-transitory computer-readable media of claim 4, wherein processing of the instructions by the one or more processors causes:
   upon receiving, at the application registration application from the activation server, the answer indicating that the application identification does not indicate the latest version of the particular application, displaying on the display of the MFP device a suggestion recommending inquiring the latest version of the particular application.

6. The one or more non-transitory computer-readable media of claim 5, wherein processing of the instructions by the one or more processors causes:
in response to displaying a suggestion recommending inquiring the latest version of the particular application, receiving, at the application registration application, a user input requesting the latest version of the particular application.

7. The one or more non-transitory computer-readable media of claim 4, wherein processing of the instructions by the one or more processors causes:
upon receiving, at the application registration application from the activation server, the answer indicating that the application identification does indicate the latest version of the particular application, registering the particular application with the activation server.

8. An apparatus for providing a multi-function peripheral device access to one or more external Web services, the apparatus comprising:
one or more processors;
one or more non-transitory computer-readable media storing instructions, wherein processing of the instructions by one or more processors, cause:
receiving, from a user, at an application registration application executing at a MFP device, a registration request to register a particular application with an activation server,
wherein the particular application is identified in the registration request by both a particular application identifier and a particular application version identifier;
wherein the particular application uses at least one external Web service;
in response to receiving the registration request, the application registration application performing:
obtaining a device identification of the MFP device;
generating a verification request that includes the device identification; and
transmitting the verification request to the activation server to cause the activation server to generate and send to the application registration application a response indicating whether the MFP device has been registered with the activation server; and
upon receiving, at the application registration application executing at the MFP device, from the activation server, the response;
determining whether the response indicates that the MFP device has not been registered with the activation server:
in response to determining that the response indicates that the MFP device has not been registered with the activation server, displaying a recommendation message on a display of the MFP device;
in response to determining, at the application registration application executing at the MFP device, that the response indicates that the MFP device has been registered with the activation server:
determining by the application registration application executing at the MFP device, whether the particular application version identifier, that is included in the registration request received from the user and that is of the particular application having the particular application identifier, corresponds to a latest version of the particular application having the particular application identifier, available for registration; and
in response to determining, by the application registration application executing at the MFP device, that the particular application version identifier does not correspond to the latest version of the particular application, having the particular application identifier, available for registration:
displaying, by the application registration application executing at the MFP device, a notification that a newer version than the particular application version identifier of the particular application, having the particular application identifier, is available for registration.

9. The apparatus of claim 8, wherein the recommendation message indicates recommendation to purchase a license for using the particular application from the MFP device.

10. The apparatus of claim 8, wherein processing of the instructions by the one or more processors causes: upon receiving, at the application registration application from the activation server, the response indicating that the MFP device has been registered with the activation server, proceeding to registering the particular application with the activation server.

11. The apparatus of claim 10, wherein processing of the instructions by the one or more processors causes:
obtaining an application identification of the particular application to be registered with the activation server;
generating a verification request comprising the device identification and the application identification; and
transmitting the verification request to the activation server to cause the activation server to generate and send to the application registration application an answer indicating whether the application identification indicates the latest version of the particular application.

12. The apparatus of claim 11, wherein processing of the instructions by the one or more processors causes:
upon receiving, at the application registration application from the activation server, the answer indicating that the application identification does not indicate the latest version of the particular application, displaying on the display of the MFP device a suggestion recommending inquiring the latest version of the particular application.

13. The apparatus of claim 12, wherein processing of the instructions by the one or more processors causes:
in response to displaying a suggestion recommending inquiring the latest version of the particular application, receiving, at the application registration application, a user input requesting the latest version of the particular application.

14. The apparatus of claim 11, wherein processing of the instructions by the one or more processors causes:
upon receiving, at the application registration application from the activation server, the answer indicating that the application identification does indicate the latest version of the particular application, registering the particular application with the activation server.

15. A method for providing a multi-function peripheral device with access to one or more external Web services, the method comprising:
receiving, from a user, at an application registration application executing at a MFP device, a registration request to register a particular application with an activation server,
wherein the particular application is identified in the registration request by both a particular application identifier and a particular application version identifier;

wherein the particular application uses at least one external Web service;
in response to receiving the registration request, the application registration application executing at the MFP device performing:
obtaining a device identification of the MFP device;
generating a verification request that includes the device identification; and
transmitting the verification request to the activation server to cause the activation server to generate and send to the application registration application a response indicating whether the MFP device has been registered with the activation server; and
upon receiving, at the application registration application from the activation server, the response;
determining whether the response indicates that the MFP device has not been registered with the activation server:
in response to determining that the response indicates that the MFP device has not been registered with the activation server, displaying a recommendation message on a display of the MFP device;
in response to determining, by the application registration application executing at the MFP device, that the response indicates that the MFP device has been registered with the activation server:
determining, by the application registration application executing at the MFP device, whether the particular application version identifier, that is included in the registration request received from the user and that is of the particular application having the particular application identifier, corresponds to a latest version of the particular application having the particular application identifier, available for registration; and
in response to determining, by the application registration application executing at the MFP device, that the particular application version identifier does not correspond to the latest version of the particular application, having the particular application identifier, available for registration:
displaying, by the application registration application executing at the MFP device, a notification that a newer version than the particular application version identifier of the particular application, having the particular application identifier, is available for registration.

16. The method of claim 15, wherein the recommendation message indicates recommendation to purchase a license for using the particular application from the MFP device.

17. The method of claim 15, further comprising:
upon receiving, at the application registration application from the activation server, the response indicating that the MFP device has been registered with the activation server, proceeding to registering the particular application with the activation server.

18. The method of claim 17, further comprising:
obtaining an application identification of the particular application to be registered with the activation server;
generating a verification request comprising the device identification and the application identification; and
transmitting the verification request to the activation server to cause the activation server to generate and send to the application registration application an answer indicating whether the application identification indicates the latest version of the particular application.

19. The method of claim 18, further comprising:
upon receiving, at the application registration application from the activation server, the answer indicating that the application identification does not indicate the latest version of the particular application, displaying on the display of the MFP device a suggestion recommending inquiring the latest version of the particular application.

20. The method of claim 19, further comprising:
in response to displaying a suggestion recommending inquiring the latest version of the particular application, receiving, at the application registration application, a user input requesting the latest version of the particular application.

* * * * *